United States Patent [19]

Drewery et al.

[11] Patent Number: 5,333,014

[45] Date of Patent: Jul. 26, 1994

[54] NON-SHARP CUT FILTERS FOR ASSEMBLING AND SPLITTING IN WESTON CLEAN PAL

[75] Inventors: John O. Drewery, Sutton; Nicholas D. Wells, Brighton, both of United Kingdom

[73] Assignee: British Broadcasting Corporation, London, United Kingdom

[21] Appl. No.: 923,966

[22] PCT Filed: Jan. 24, 1992

[86] PCT No.: PCT/GB92/00143

§ 371 Date: Sep. 17, 1992

§ 102(e) Date: Sep. 17, 1992

[87] PCT Pub. No.: WO92/13425

PCT Pub. Date: Aug. 6, 1992

[30] Foreign Application Priority Data

Jan. 24, 1991 [GB] United Kingdom ............... 9101529.7
Mar. 5, 1991 [GB] United Kingdom ............... 9104559.1

[51] Int. Cl.⁵ .................... H04N 9/64; H04N 9/78
[52] U.S. Cl. .................... 348/453; 348/471; 348/624; 348/493; 348/663
[58] Field of Search ............... 358/31, 11, 12, 16, 358/35, 36, 13; 456/306, 307; H04N 9/78, 11/16, 11/20, 9/64

[56] References Cited

U.S. PATENT DOCUMENTS

| 4,051,516 | 9/1977 | Weston ................... 358/11 |
| 4,212,028 | 7/1980 | Drewery ................. 358/11 |
| 4,288,810 | 9/1981 | Drewery et al. ......... 358/16 |
| 4,322,739 | 3/1982 | Drewery et al. ......... 358/13 |
| 4,399,454 | 8/1983 | Warnock et al. ........ 358/16 |

FOREIGN PATENT DOCUMENTS 2113037A 7/1983 United Kingdom .......... H04N 9/39

OTHER PUBLICATIONS

EBU Review/Technic, J. O. Drewery, "A Compatible Improved PAL System", No. 215, Feb. 1986.

*Primary Examiner*—James J. Groody
*Assistant Examiner*—Safet Metjahic
*Attorney, Agent, or Firm*—Robert F. O'Connell

[57] ABSTRACT

An assembler and splitter of a Weston PAL (W-PAL) video signal has filter functions $F_1$, $F_2$ at the assembler for the luminance and chrominance components and corresponding functions $F_3$, $F_4$ at the splitter. The transfer functions are defined as
$F_1 = (L_2+L_1)/2 + (L_2-L_1)z^{-1/2}$,
$F_2 = -(H_1-H_2)/2 + (H_1+H_2)z^{-1/2}$,
$F_3 = (L_2-L_1)/2 + (L_2+L_1)z^{-1/2}$,
$F_4 = (H_1+H_2)/2 - (H_1-H_2)z^{-1/2}$ and wherein $H_1(f) = L_2(2fsc-f)$ and $H_2(f) = L_1(2fsc-f)$. Thus the filters are non-sharp cut and are compatible with normal PAL.

18 Claims, 8 Drawing Sheets

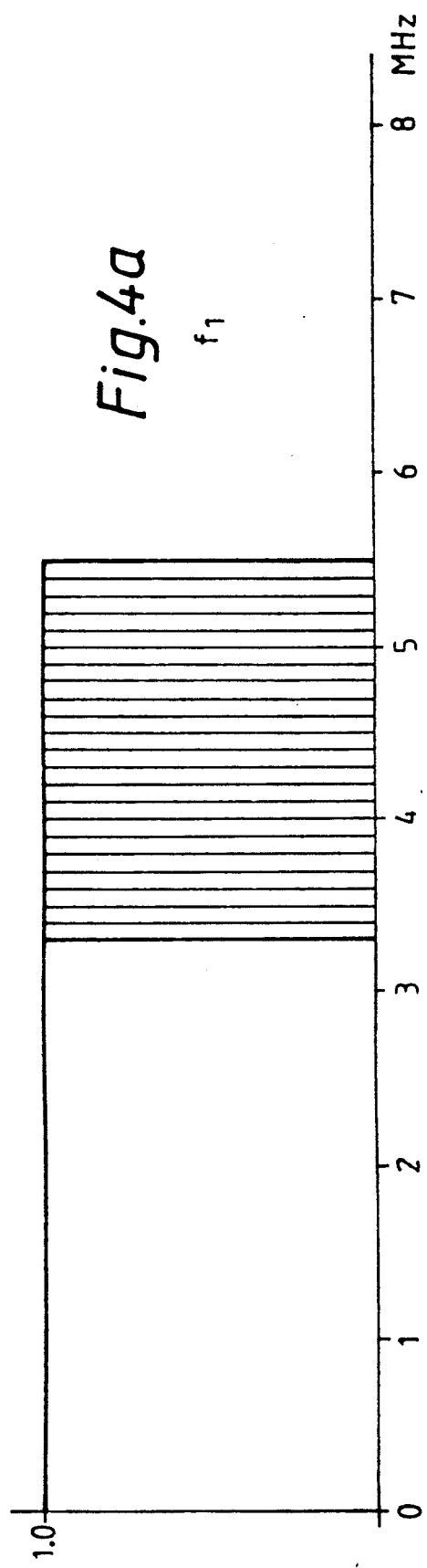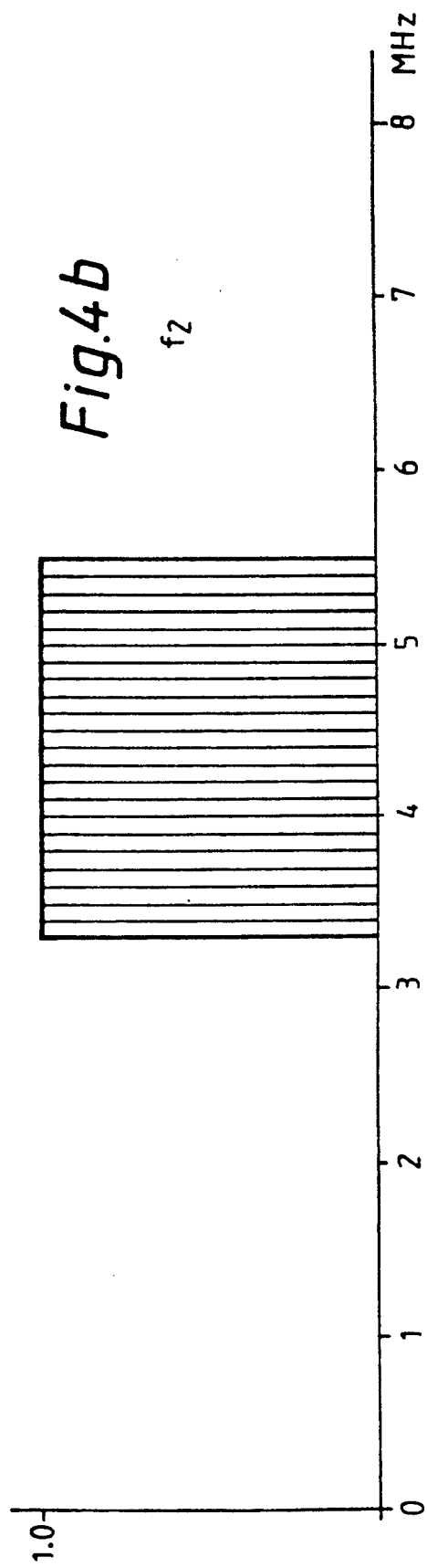

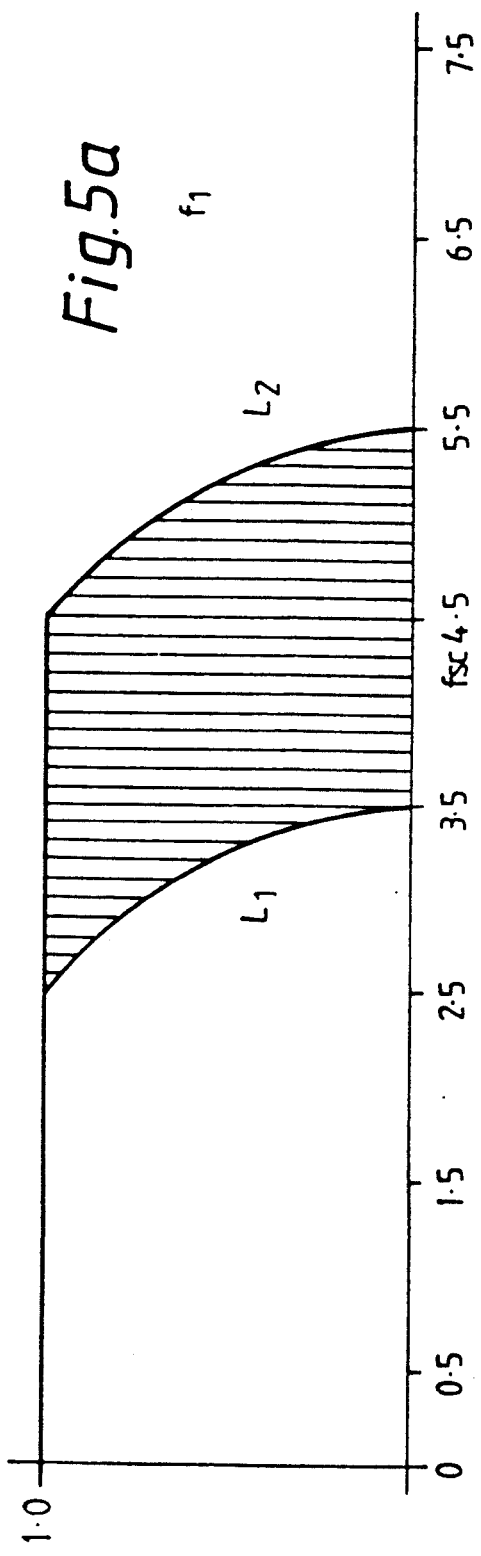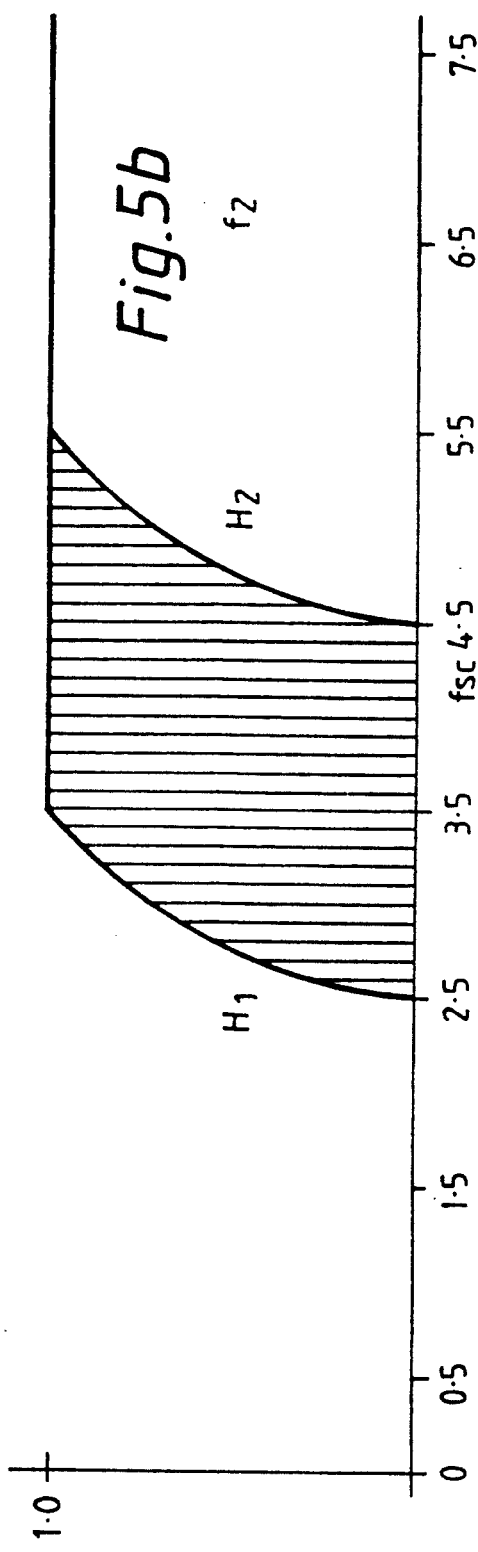

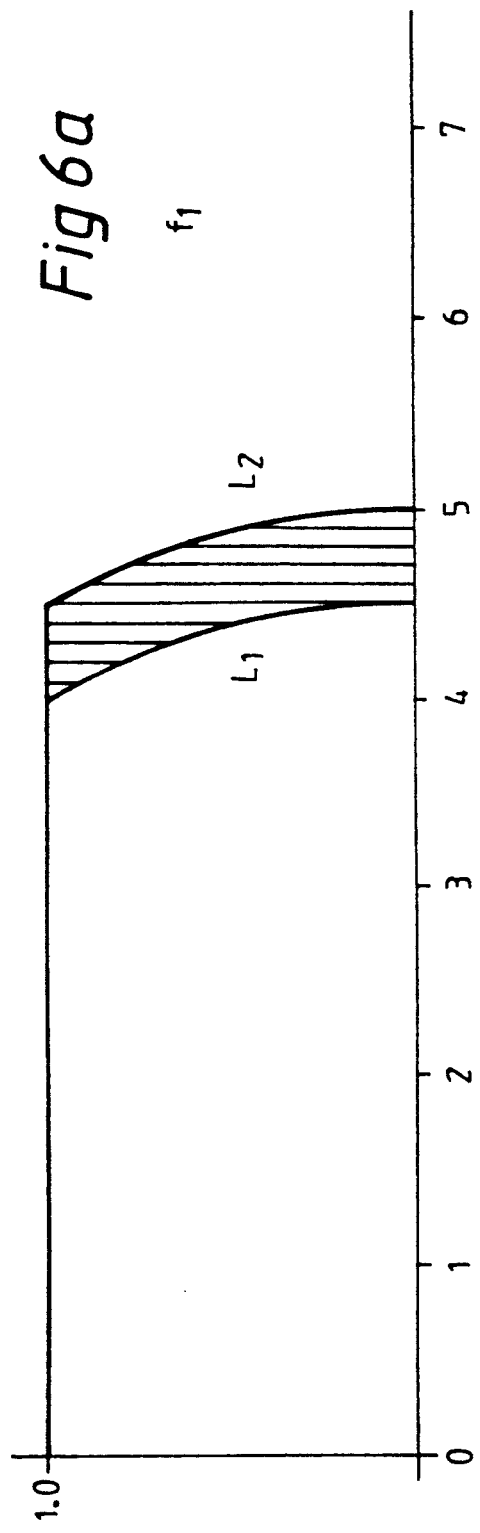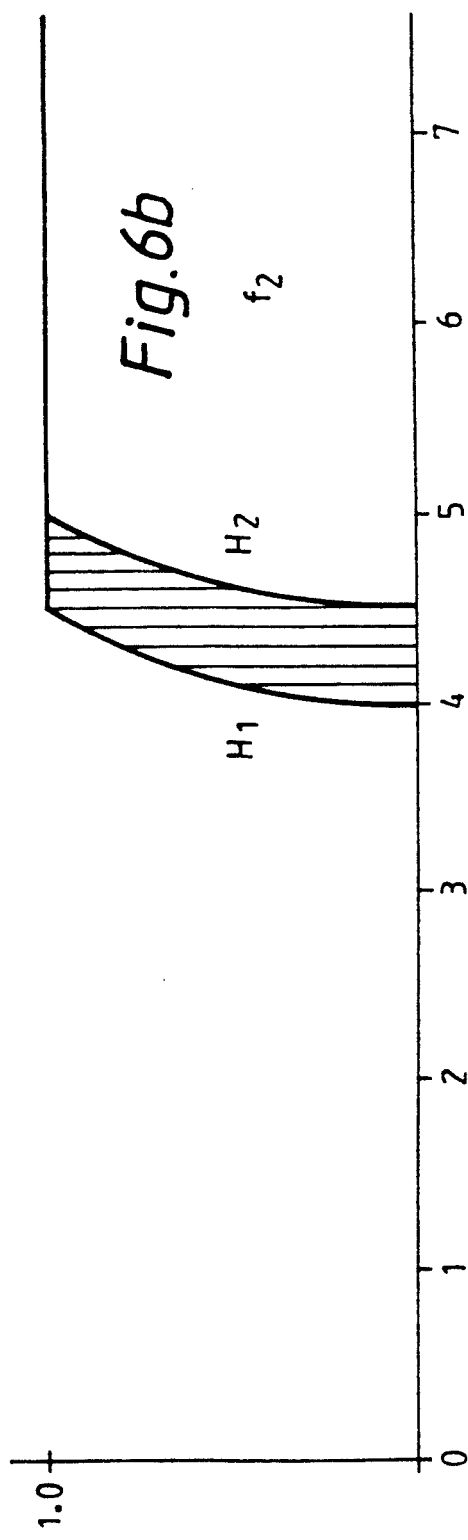

NON-SHARP CUT FILTERS FOR ASSEMBLING AND SPLITTING IN WESTON CLEAN PAL

FIELD OF THE INVENTION

This invention relates to the Weston PAL video signal (W-PAL), and in particular to improvements in the assembler and splitter which respectively, assemble and split luminance Y and chrominance (U+V/U−V) components.

BACKGROUND TO THE INVENTION

The Weston Clean PAL system is described in GB Nos. 1534268 to 1534270 and in BBC Research Department Report No: 1980/1. The contents of these four documents are incorporated herein by reference. W-PAL obtains separation of luminance and chrominance by phase segregation, whereby the luminance is sampled at a frequency of twice the colour subcarrier frequency thereby causing it to appear as double sideband modulation of the colour subcarrier. At the same time the two chrominance components are formed into a single signal consisting of the quantities $(U+V)/\sqrt{2}$ and $(U-V)/\sqrt{2}$ on alternate lines which modulates the subcarrier directly. If PAL compatibility were not required the two modulation processes could be in quadrature so enabling the subcarrier to carry both luminance and chrominance without interaction in spite of their occupying the same spectral space. FIG. 1 shows the two-dimensional spectrum of the alternate-line chrominance and the sampled luminance, from which it can be seen that there is a considerable overlap of the luminance and chrominance spectra, amounting to the region 3.36–5.5 MHz in system I PAL. This region is the region in which aliasing will occur at 2 Fsc sampling (8.86 MHz−5.5 MHz=3.36 MHz) and varies with different PAL standards.

Compatibility with normal PAL, however, requires that the signals are further processed before combination. In particular, the combined chrominance signal must be phase shifted so that spectral components at ¾ line offsets are in phase quadrature with components at ¼ line offsets, restoring the phase quadrature between U and V. This must be done in such a way as to preserve the potential phase separation between chrominance and luminance. At the receiver, the UV phase separation is removed and the luminance and chrominance are separated by synchronous demodulation. These complex functions are provided by so-called assembler and splitter circuits which lie at the core of the Weston Clean PAL system. These circuits are described in GB Nos. 1534268 and 1534270.

SUMMARY OF THE INVENTION

The present invention aims to provide an improved assembler and splitter through improved filter design.

We have appreciated that cross colour effects may be eliminated without affecting the luminance bandwidth and independently of the link filter in the PAL transmission channel. This may be achieved by ensuring that filters in the W-PAL assembler and splitter have the correct interrelationship.

We have appreciated that the filter in the luminance channel of the splitter must have an amplitude which is a shifted mirror of the filter in the chrominance path of the assembler. Moreover, the filter in the chrominance path of the splitter must have an amplitude which is a shifted mirror of the amplitude of the filter in the luminance path of the assembler. Furthermore, the product of the filters in the luminance paths in the assembler and splitter must be a Nyquist filter. Similarly, the product of the filters in the chrominance path of the assembler and splitter must also be a Nyquist filter.

The phase of the luminance and chrominance filters in the splitter may be the anti-mirror of the phase of the chrominance and luminance filters respectively in the assembler.

Preferably, the filter in the luminance channel of the assembler extinguishes below the frequency of the link filter in the PAL channel. This means that variations in link bandwidth affect the horizontal chrominance bandwidth only and not the ability to eliminate cross colour effects or the luminance bandwidth.

The invention is set out in the independent claims to which reference should be made.

Various modifications, further improvements and preferred features are set out in the dependent claims.

DESCRIPTION OF DRAWINGS

An embodiment of the invention will now be described with reference to the drawings in which:

FIG. 4 a) and b) shows the amplitudes of the frequency characteristics of the functions $F_1$ and $F_2$ of FIG. 3 in the known system shown in FIG. 2;

FIG. 5 a) and b) show examples of the amplitudes of the frequency characteristics of the functions $F_1$ and $F_2$ respectively of FIG. 3 embodying the invention;

FIG. 6 a) and b) show examples of the amplitudes of the frequency characteristics of the functions $F_1$ and $F_2$ respectively of FIG. 3 also second embodying the invention.

DETAILED DESCRIPTION OF THE INVENTION

Figure 1:
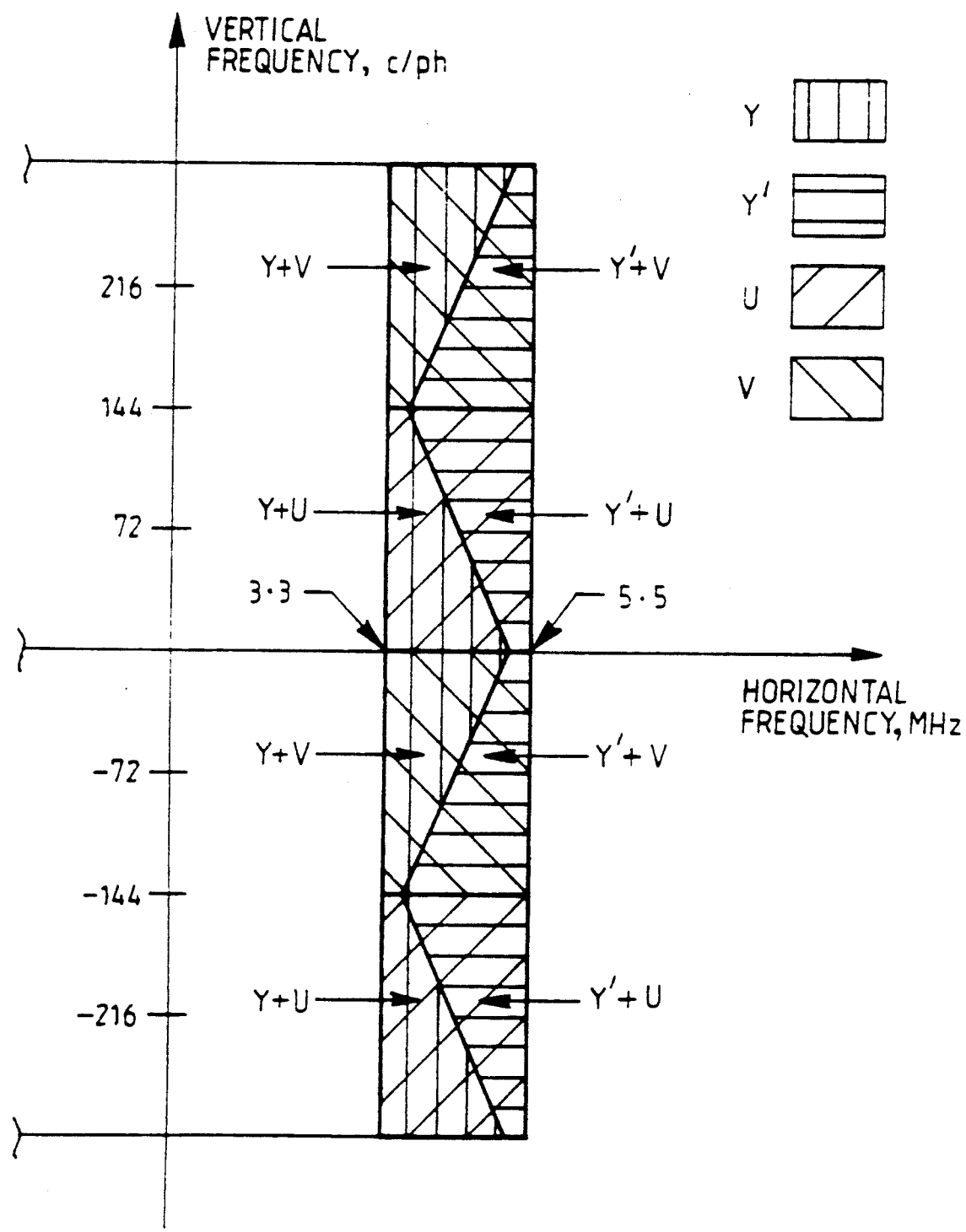
FIG. 1 shows the two dimensional spectrum of sampled luminance and line alternating chrominance modulated on the subcarrier and showing spectral overlap.
Figure 2:
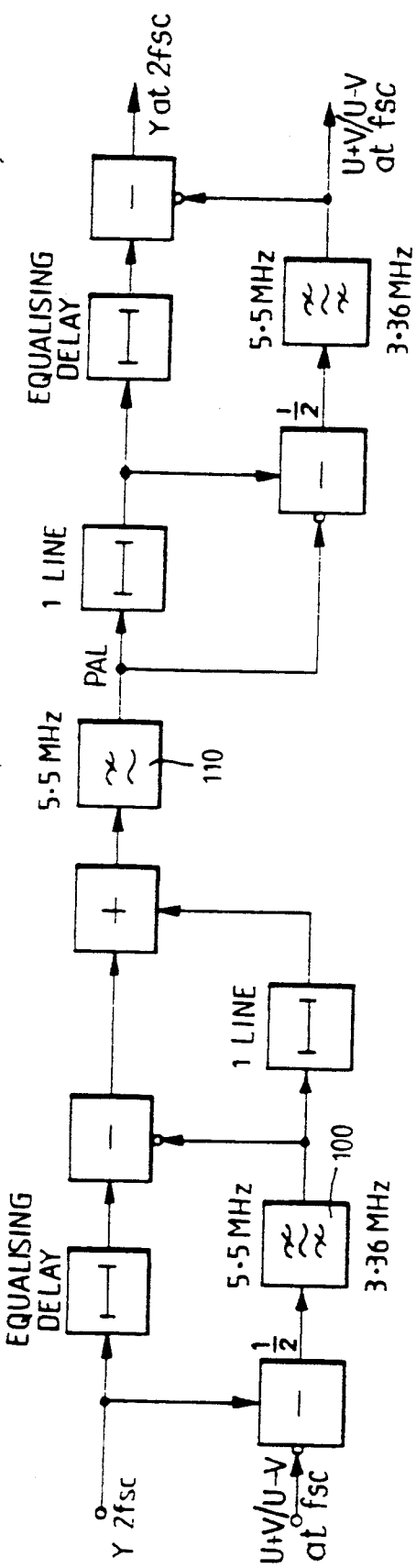
FIG. 2 shows, in block form, the components of a conventional Weston Clean PAL assembler and splitter.

The assembler and splitter used by the original Weston Clean PAL system are shown for convenience in FIG. 2 and would be well-known to those in the art. This circuit accepts luminance sampled at twice the subcarrier frequency and combined chrominance modulated on the subcarrier, in phase with the sampling. Synchronous sampling of the luminance output and cophased demodulation of the chrominance output yield signals without cross-effects. As can be seen, both sending and receiving networks are characterised by a single band-pass filter 100 which defines the region of luminance/chrominance spectral overlap together with a line delay which helps to form a comb filter in this region. The low-pass filter 110 is needed to ensure correct luminance performance and is assumed to occur on the link between sender and receiver. The transfer functions for the luminance to PAL and PAL to luminance paths are not identical since, at the sender, the low frequencies are undelayed whereas, at the receiver, they are delayed by one line. This equalises the delay in the overlap region which is half a line at both ends.

Figure 3:
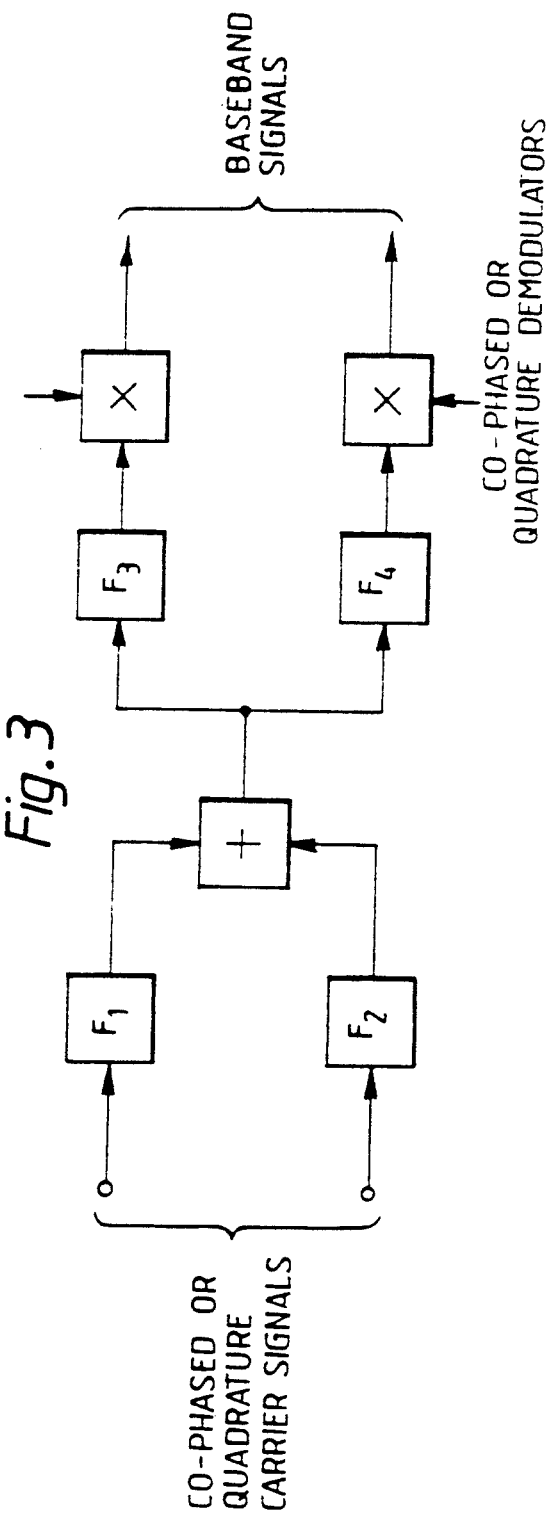
FIG. 3 shows the generic circuit form of the circuit of FIG. 2.

The generic form of the assembler and splitter is shown in FIG. 3 which defines filter functions $F_1$, $F_2$, $F_3$ and $F_4$. In the above case the input and output carriers are cophased, as previously mentioned. The filter functions for FIG. 2 then become $$F_1 = L[1 + B(z^{-1} - 1)/2]$$

$$F_2 = LB(1 - z^{-1})/2$$

$$F_3 = z^{-1} + B(1 - z^{-1})/2$$

$$F_4 = B(z^{-1} - 1)/2$$

where $z^{-1}$ is the transfer function of a line delay, i.e.

$$z^{-1} = \exp(-j\theta)$$

where $$\theta = 2\pi f T_L$$

and L and B are the transfer functions of the low- and band-pass filters respectively. The amplitudes of the frequency characteristics of $F_1$ and $F_2$, remembering that they are complex, are shown in FIG. 4. That of $F_4$ is identical to that of $F_2$ whilst that of $F_3$ is similar to that of $F_1$ without the upper band limit.

The use of a band-pass filter in combination with a low-pass filter is bad practice since two filters define the upper edge of the signal. This is an historical hangover from the original hardware implementation of the system in which the band-pass filter worked at a sampling frequency of 2fsc as described in GB No. 1534268 and BBC Research Department Report No: 1976/24. The theory of the original system assumed that the filters were of infinitely sharp cut so that this did not matter. The objection can be answered by replacing the band-pass filter with a high-pass filter.

Perfect phase segregation, however, still appears to require filters with an infinitely sharp cut. Practical filters have a finite rate of cut and so the phase segregation will potentially fail at the edges of the overlap band in the transition regions of the low- and high-pass filters. This undermines the case for phase segregation since it is based on the proposition that luminance-chrominance separation does not depend on sharp cut filters as it does with band-segregation. (In mitigation, the failure is with horizontal filters which can be made sharper than vertical or temporal filters). It is therefore of crucial importance to discover if this requirement for sharp cut filters is fundamental. Experience with filtering for sub-Nyquist PAL, sampled at 2fsc, suggests that this may not be so.

It has been shown that the general requirements on the filters $F_1$, $F_2$, $F_3$ and $F_4$, if the carriers are cophased, are given by $$F_1 F_3 = Ny$$

$$F_2 F_4 = Nc$$

$$F_1 F_4 = jSyc$$

$$F_2 F_3 = jScy$$

where N is any skew-symmetric function and S is any symmetric function about the carrier frequency, that is, $$N(f) = 1 - N^*(2fsc - f)$$

and $$S(f) = S^*(2fsc - f)$$

remembering that N and S can be complex. This condition for N makes it a so-called Nyquist filter. If these conditions are obeyed then the pure imaginary cross transfer functions put the unwanted signals in quadrature with the demodulating sinewaves in both cases whilst the transfer functions for the wanted signals are flat through the complementary sideband principle.

Now, considering the transfer functions of the original systems with perfect filters, the wanted and cross characteristics within the combing region, where B and L are unity, are given by $$F_y = F_1 F_3 = \tfrac{1}{4}(1 + 2z^{-1} + z^{-2})$$

$$= \tfrac{1}{2} z^{-1}(1 + \cos \theta)$$

$$F_c = F_2 F_4 = \tfrac{1}{4}(-1 + 2z^{-1} - z^{-2})$$

$$= \tfrac{1}{2} z^{-1}(1 - \cos \theta)$$

$$F_{yc} = F_1 F_4 = \tfrac{1}{4}(z^{-2} - 1)$$

$$= -\tfrac{1}{2} z^{-1} j \sin \theta$$

$$F_{cy} = F_2 F_3 = \tfrac{1}{4}(1 - z^{-2})$$

$$= \tfrac{1}{2} z^{-1} j \sin \theta$$

As $\theta$ has the value $3\pi/2$ at fsc it is clear that, within the combing region, the transfer functions of the wanted signals are skew-symmetric whilst those of the cross signals are symmetric. Thus we may write $$Fy = z^{-1} N_1$$

$$Fc = z^{-1} N_2$$

$$Fyc = -z^{-1} jS$$

$$Fcy = z^{-1} jS$$

where $$N_1 = \tfrac{1}{2}(1 + \cos \theta)$$

$$N_2 = \tfrac{1}{2}(1 - \cos \theta)$$

$$S = \tfrac{1}{2} \sin \theta.$$

As the combing region is symmetrical about fsc it follows that Fy is still skew-symmetric outside it since Fy rises to unity below it and drops to zero beyond it. However, at the edges of the combing region, it is still possible for its skew symmetry to hold if the shapes of the upper and lower edges obey the condition since the contents of the envelope already obey the condition. However, it is clear that this situation does not apply to Fc since $F_2$ and $F_4$ are zero on both sides of the combing region and therefore also Fyc and Fcy. But it does suggest that a solution might be possible if $F_2$ and $F_4$ are allowed to remain at unity at one end of the combing region with conditions on the upper and lower edges.

Consider amplitude transfer functions for $F_1$ and $F_2$ as shown in FIG. 5 with those for $F_3$ and $F_4$ being identical. $F_1$ is now characterised by two low-pass filters, $L_1$ and $L_2$, which define the lower and upper edges of the combing region whilst $F_2$ is characterised by two high-pass filters, $H_1$ and $H_2$, which do the same for the chrominance. Note that $F_2$ continues at unity indefinitely as the frequency rises.

Taking into account the need for equalising the delay between low and high frequencies, let the transfer functions be $$F_1 = L_1 + (L_2 - L_1)(1 + z^{-1})/2$$

$$F_2 = H_2 z^{-1} + (H_1 - H_2)(z^{-1} - 1)/2$$

$$F_3 = L_1 z^{-1} + (L_2 - L_1)(1 + z^{-1})/2$$

$$F_4 = H_2 + (H_1 - H_2)(1 - z^{-1})/2.$$

Then, after some algebraic manipulation, the wanted and cross transfer functions are given by $$Fy = z^{-1}[L_2^2 N_1 + L_1^2 N_2]$$

$$Fc = z^{-1}[H_2^2 N_1 + H_1^2 N_2]$$

$$Fyc = z^{-1}[L_2 H_2 N_1 - L_1 H_1 N_2 + j(L_1 H_2 + L_2 H_1)S]$$

$$Fcy = z^{-1}[L_2 H_2 N_1 - L_1 H_1 N_2 - j(L_1 H_2 + L_2 H_1)S]$$

where $N_1$, $N_2$ and $S$ are the transfer functions of the "ideal" system in the combing region, as defined above.

Where the filters $L_1$, $L_2$, $H_1$ and $H_2$ are sharp cut, these equations reduce to those above except that Fyc and Fcy are reversed in sign. Thus, in Fy at low frequencies, where both $L_1$ and $L_2$ are unity, the function $N_1 + N_2$ is also unity and similarly for Fc at high frequencies. In Fyc and Fcy, the functions $L_1 H_1$ and $L_2 H_2$ are zero since they are products of coincident infinitely sharp rising and falling edges. Meanwhile, the function $L_1 H_2 + L_2 H_1$ corresponds to a bandpass filter because the first term is zero as $L_1$ and $H_2$ do not overlap.

In a practical situation where the filters are not sharp cut we can impose the requirements for skew symmetry to yield conditions on the filters. For FY we have, substituting for $N_1$, $N_2$ and $S$:

$$L_2^2(f) + L_1^2(f) + [L_2^2(f) - L_1^2(f)]\cos\theta + L_2^2(2fsc-f) + L_1^2(2fsc-f) + [L_2^2(2fsc-f) - L_1^2(2fsc-f)]\cos(2\theta sc - \theta) = 2$$

where $$\theta_{sc} = 2\pi f_{sc} T_L$$
$$= 3\pi/2$$

Substituting for $\theta$sc and equating powers of $\cos\theta$ we have $$L_2^2(f) + L_1^2(f) + L_2^2(2fsc-f) + L_1^2(2fsc-f) = 2$$

and $$L_2^2(f) - L_1^2(f) - L_2^2(2fsc-f) + L_1^2(2fsc-f) = 0$$

which leads to $$L_2^2(f) + L_1^2(2fsc-f) = 1$$

which means that $L_1^2$ is the complement of the characteristic of $L_2^2$ reflected about the frequency fsc.

In the same way, for Fc we have $$H_2^2(f) + H_1^2(f) + [H_2^2(f) - H_1^2(f)]\cos\theta + H_2^2(2fsc-f) + H_1^2(2fsc-f) + [H_2^2(2fsc-f) - H_1^2(2fsc-f)]\cos(2\theta sc - \theta) = 2.$$

Substituting for $\theta$sc and equating powers of $\cos\theta$ we have $$H_2^2(f) + H_1^2(f) + H_2^2(2fsc-f) + H_1^2(2fsc-f) = 2$$

and $$H_2^2(f) - H_1^2(f) - H_2^2(2fsc-f) = 0$$

which leads to $$H_2^2(f) + H_1^2(2fsc-f) = 1$$

which means that $H_1^2$ is the complement of the characteristic of $H_2^2$ reflected about the frequency fsc.

Turning to Fyc and Fcy however, it is clear that the original conditions cannot be satisfied because, in addition to the pure imaginary term, there is also a real term which is non-zero when the filters are not sharp cut. All is not lost, however, since it is possible to have $$Fyc = z^{-1}[A + jS_1]$$

where A is truly antisymmetrical about the subcarrier frequency, i.e.

$$A(f) = -A^*(2fsc-f)$$

since, upon demodulation, each frequency component of the upper sideband is cancelled by the corresponding lower sideband component of a signal undergoing the transfer function A.

Imposing the antisymmetry condition on the real part:

$$L_2(f)H_2(f) - L_1(f)H_1(f) + [L_2(f)H_2(f) + L_1(f)H_1(f)]\cos\theta +$$
$$L_2(2f_{sc} - f)H_2(2f_{sc} - f) - L_1(2f_{sc} - f)H_1(2f_{sc} - f) +$$
$$[L_2(2f_{sc} - f)H_2(2f_{sc} - f) +$$
$$L_1(2f_{sc} - f)H_1(2f_{sc} - f)]\cos(2\theta_{sc} - \theta) = 0$$

Substituting for $\theta$sc and equating powers of $\cos\theta$ we have $$L_2(f)H_2(f) - L_1(f)H_1(f) + L_2(2fsc-f)H_2(2fsc-f) - L_1(2fsc-f)H_1(2fsc-f) = 0$$

and $$L_2(f)H_2(f) + L_1(f)H_1(f) - L_2(2fsc-f)H_2(2fsc-f) - L_1(2fsc-f)H_1(2fsc-f) = 0$$

which leads to $$L_2(f)H_2(f) - L_1(2fsc-f)H_1(2fsc-f) = 0.$$

Substituting for $L_1$ and $H_1$ in terms of $L_2$ and $H_2$, as derived above, gives $$L_2(f)H_2(f) = \sqrt{[1-L_2^2(f)]}\sqrt{[1-H_2^2(f)]}$$

which, after some algebraic manipulation, gives $$L_2^2(f) + H_2^2(f) = 1$$

and hence $$L_1^2(f) + H_1^2(f) = 1$$

or $$L_1(2f_{sc} - f) = H_2(f)$$

and $$L_2(2f_{sc} - f) = H_1(f)$$

showing that $H_2$ is the reflection of $L_1$ about $f_{sc}$ whilst $H_1$ is the reflection of $L_2$ about $f_{sc}$ and also that $H_1$ is square root complementary to $L_1$ whilst $H_2$ is square root complementary to $L_2$. This latter means that $H_1$ and $H_2$ cannot be obtained from $L_1$ and $L_2$ by simple subtraction.

Imposing the symmetry condition on the pure imaginary part:

$$[L_1(f)H_2(f) + L_2(f)H_1(f)]\sin\theta = [L_1(2f_{sc}-f)H_2(2f_{sc}-f) + L_2(2f_{sc}-f)H_1(2f_{sc}-f)]\sin(2\theta_{sc} - \theta).$$

Substituting for $\theta_{sc}$ we have $$\sin(2\theta_{sc} - \theta) = \sin\theta$$

and $$L_1(f)H_2(f) + L_2(f)H_1(f) = L_1(2f_{sc}-f)H_2(2f_{sc}-f) + L_2(2f_{sc}-f)H_1(2f_{sc}-f).$$

Again, this can be satisfied by $$L_2(2f_{sc} - f) = H_1(f)$$

and $$L_1(2f_{sc} - f) = H_2(f)$$

showing that the above result is consistent.

The relationship derived between $L_2$ and $H_1$ and between $L_1$ and $H_2$ means that $F_4$ is, in fact, the shifted version of $F_1$ and $F_3$ is the shifted version of $F_2$ (actually the negative), that is $$\begin{aligned} F_4(f) &= F_1(f - 2f_{sc}) \\ &= F_1*(2f_{sc} - f) \end{aligned}$$

and $$\begin{aligned} F_3(f) &= -F_2(f - 2f_{sc}) \\ &= -F_2*(2f_{sc} - f) \end{aligned}$$

since $$z^{-1}(f - 2f_{sc}) = -z^{-1}(f)$$

It is these facts which help to give $F_1F_4$ and $F_2F_3$ the special properties. Note that this would not be so if $F_2$ and $F_4$ were interchanged. But they could be if $F_1$ and $F_3$ were also interchanged.

The derived relationships show that once one of the filters $L_1$, $L_2$, $H_1$ and $H_2$ is specified it sets the others. Phase segregation imposes no restriction on the form of the specified filter but the form does govern the nature of the compatibility of the assembled PAL signal with conventional PAL. If we choose to specify $L_2$ then this means that phase segregation would allow its transition band to lie, for example, anywhere in the original combing region between 3.3 MHz and 5.5 MHz but compatibility would require it to start at or beyond fsc so that the PAL signal is compatible in uniform-coloured areas. For example, FIG. 5 shows a characteristic which starts at fsc and stops at 5.5 MHz and is the square root of a linear decrease whilst FIG. 6 shows a sharper characteristic which starts at fsc and stops at 5 MHz. In such a case the signal beyond the combing region is the line-alternating $U+V$, $U-V$ chrominance signal modulated on the subcarrier.

One consequence of this is that it can be arranged that the characteristic of $L_2$ is extinguished at a frequency which is below the cut frequency of any filter which exists on the PAL link such as might be expected in, for example, a transmitter. Then the properties Fy, Fyc and Fcy are not dependent on such an external filter which only affects the property Fc. In other words, band limiting the PAL signal affects only the chrominance bandwidth and not the luminance bandwidth or the phase segregation. This is extremely important, especially in the context of differing PAL systems. For example, the characteristics of FIG. 6 will be compatible with both systems I and B/G.

To obtain circuit realisations of the transfer functions $F_1$, $F_2$, $F_3$ and $F_4$ which are balanced the equations may be rearranged as $$F_1 = (L_2+L_1)/2 + (L_2-L_1)z^{-1}/2$$

$$F_2 = -(H_1-H_2)/2 + (H_1+H_2)z^{-1}/2$$

$$F_3 = (L_2-L_1)/2 + (L_2+L_1)z^{-1}/2$$

$$F_4 = (H_1+H_2)/2 - (H_1-H_2)z^{-1}/2.$$

Figure 7A:
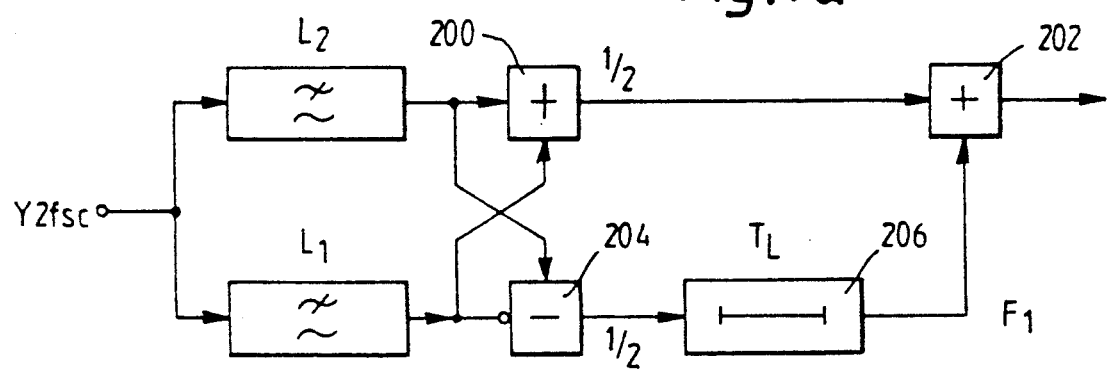
FIG. 7 a) to d) show circuit realisations of the proposed transfer functions for $F_1$, $F_2$, $F_3$ and $F_4$ in FIG. 3, embodying the invention.

FIG. 7a) to d) shows the circuits of these realisations.

In FIG. 7a) the input 2 Fsc luminance component is filtered in parallel low pass filters $L_1$, $L_2$. The output from each filter is summed by half adder 200 whose output $(L_1 + L_2)/2$ forms an input to adder 202. A half subtractor 204 has an input from filter $L_2$ and an inverted input from filter $L_1$ giving an output $(L_2 - L_1)/2$. This output is delayed by one video line by line delay 206 as required by the Weston PAL system (see FIG. 2) and forms the second input to adder 202. The output from adder 202 forms one input to the adder shown in the generic circuit diagram of FIG. 3. The other input is provided by the circuit of FIG. 7b) which operates on the Fsc $U+V/U-V$ chrominance signal. The circuit is similar to that of FIG. 7a) but the low pass filters are replaced by high pass filters $H_1$, $H_2$ and the output from the half adder 210, rather than the half subtractor 212, is delayed by video line delay 214. Subtractor 216 provides the second input to the adder of the generic circuit.

Figure 7B:
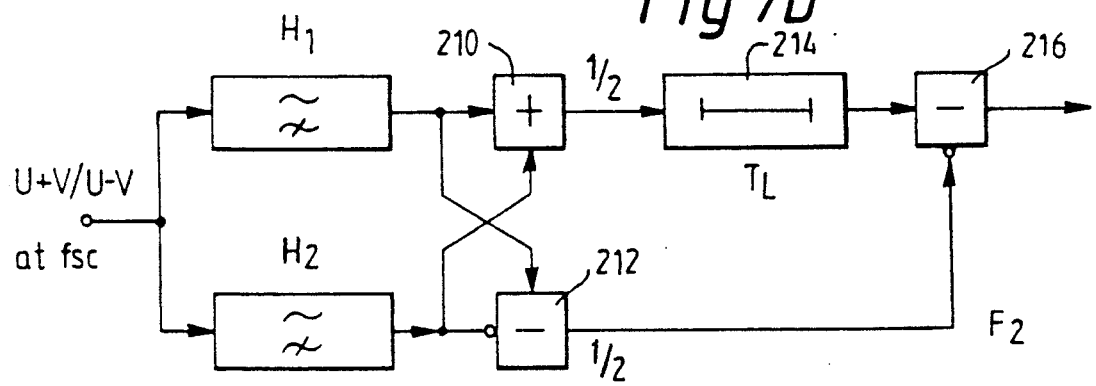
Figure 7C:
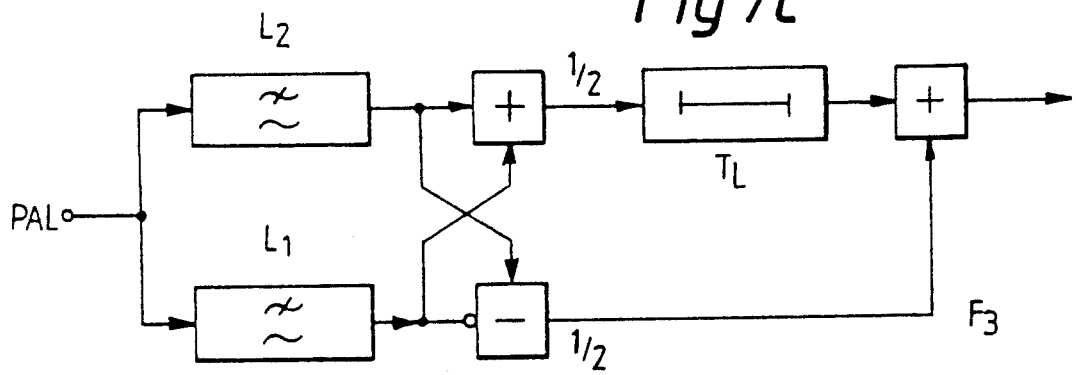
Figure 7D:
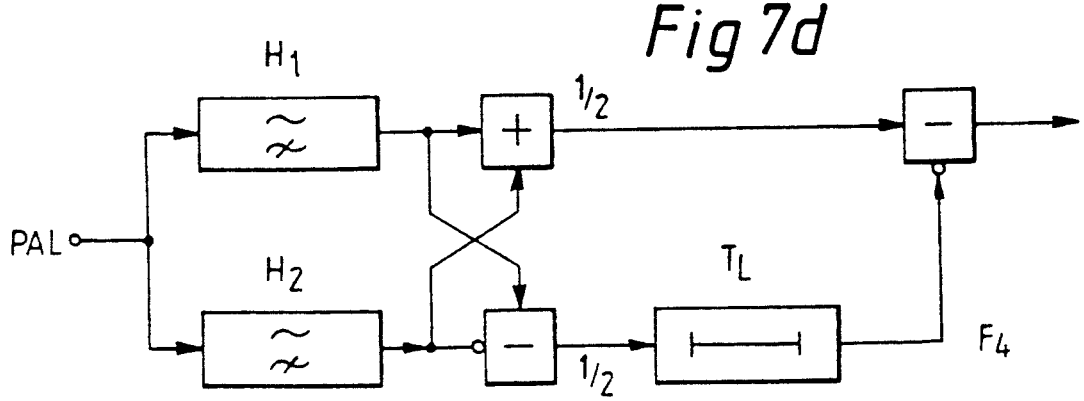

FIG. 7c) operates on the PAL luminance component and its frequency characteristic is a shifted version of the filter of FIG. 7b). FIG. 7d) has a frequency characteristic which is a shifted version of FIG. 7a). The relationship between these filters was discussed earlier.

Figure 8A:
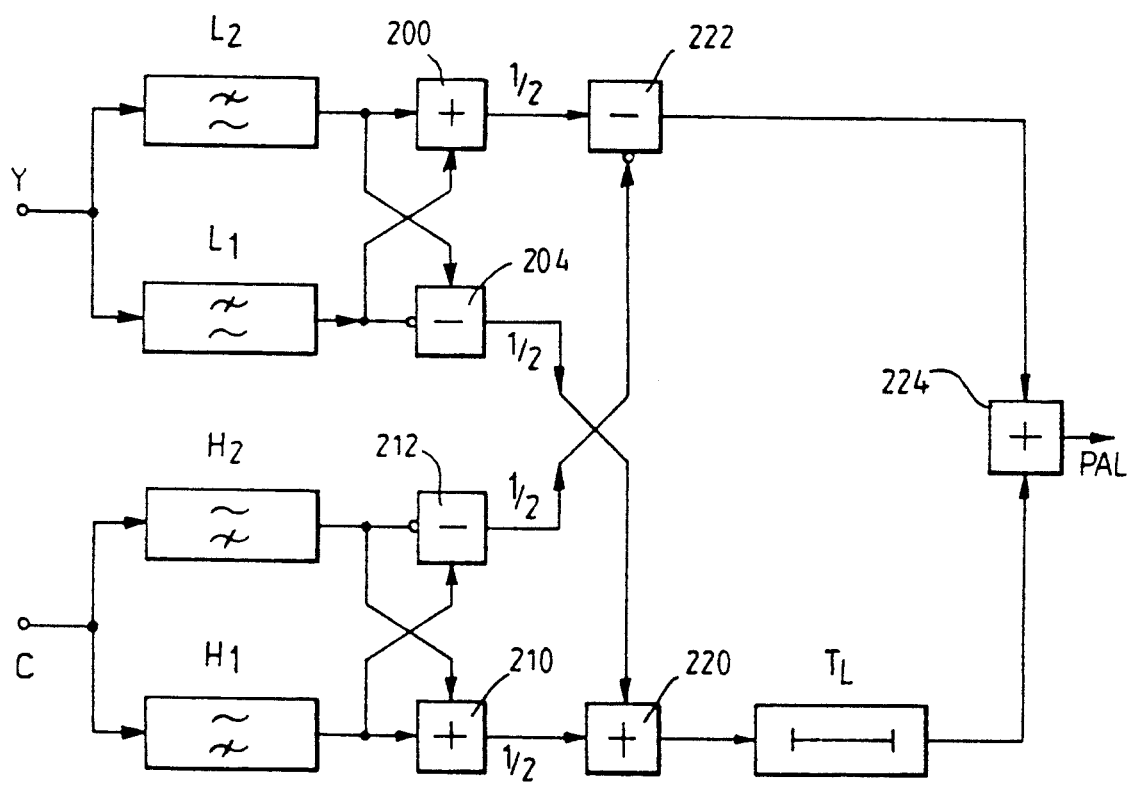
FIG. 8 a) and b) shows improvements to FIG. 7 in which functions $F_1$ and $F_2$ and $F_3$ and $F_4$ are continued to reduce the number of components required.

FIG. 8a) shows how FIGS. 7a) and 7b) may be combined to eliminate a video line delay. In this figure the low and high pass filters and half adders correspond to the similarly positioned components in FIGS. 7a) and b). Adder 220 sums the output of half subtractor 204 in the low pass section and half adder 210 in the high pass section and provides the input to line delay 222. Subtractor 224 subtracts the output of half subtractor 212 of the high pass section from the output of half adder 200 in the low pass section. The final adder 226 corresponds to the adder in the FIG. 3 generic circuit and has a W-PAL output.

Figure 8B:
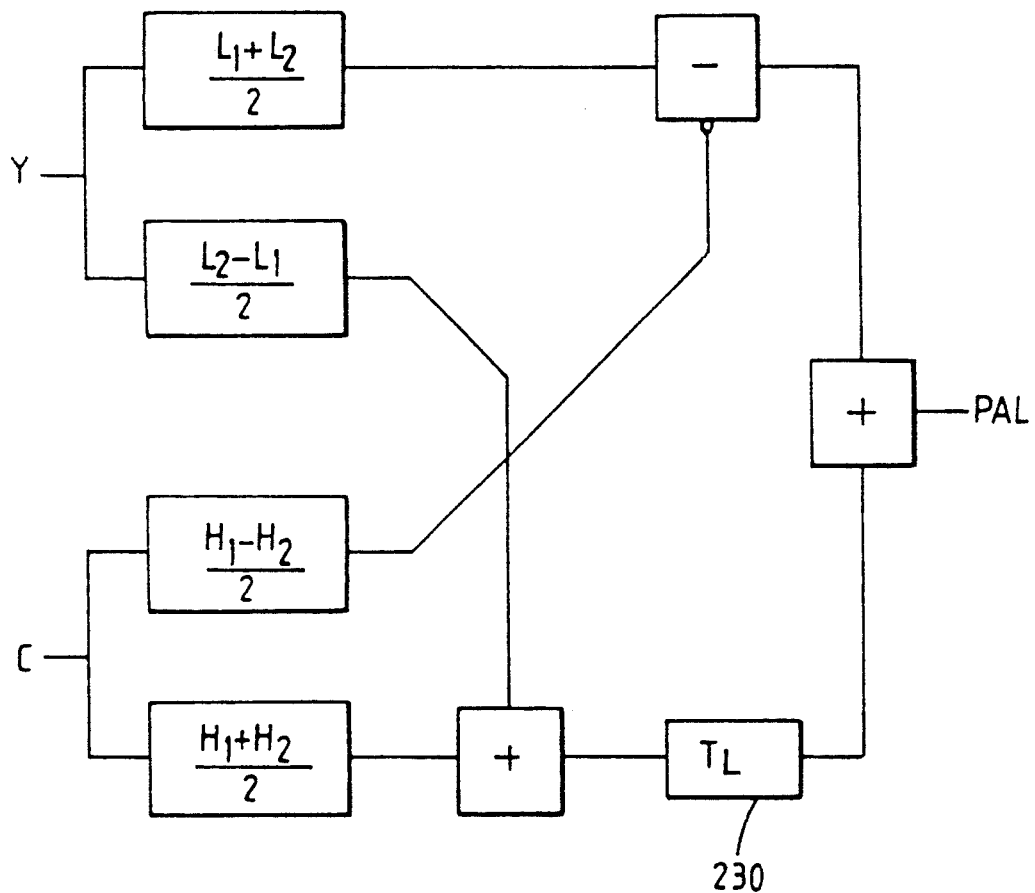

FIG. 8b) shows a similar combination of FIGS. 7c) and 7d) which reduces the number of adders and subtractors requires and uses a single line delay 230. The filters $L_1$, $L_2$, $H_1$, $H_2$ are replaced by filters $$\frac{L_2+L_1}{2}, \frac{L_2-L_1}{2}, \frac{H_1-H_2}{2} \text{ and } \frac{H_1+H_2}{2}.$$

The description has been given in the context of system I PAL which has a bandwidth of 5.5 Mhz. The assembler and splitter are equally applicable to PAL standards such as system B, G PAL with suitable variations in filter cut frequencies.

The description has described all components in terms of hardware. Many may be implemented in software.

We claim:

1. A system for transmitting and receiving a Weston Clean PAL (W-PAL) video signal in which a luminance signal Y is sampled at twice a color sub-carrier frequency f and chrominance components U, V are sampled at the color sub-carrier frequency and carried as sum (U+V) and difference (U−V) signals on alternate video lines, comprising. at a transmitter:
   an assembler for assembling co-phased or quadrature 2fsc luminance signals and fsc chrominance signals to form a W-PAL signal for transmission and having:
   a first filter means ($F_1$) for filtering the 2fsc luminance signal; and
   a second filter means ($F_2$) for filtering the fsc chrominance signals;
   and at a receiver
   a third filter means ($F_3$) for filtering a received 2fsc luminance signal; and
   a fourth filter means ($F_4$) for filtering received fsc chominance signals; wherein:
   the fourth filter means ($F_4$) is a shifted mirror of the first filter means ($F_1$), the third filter means ($F_3$) is a shifted mirror of the second filter means ($F_2$) and the product $F_1 F_3$ of the first and third filter means and the product $F_2 F_4$ of the second and fourth filter means are Nyquist filters $N_y$, $N_c$.

2. A system according to claim 1, wherein the phase of the fourth filter means is the anti-mirror of the phase of the first filter means.

3. A system according to claim 1 or 2, wherein the phase of the third filter means is the anti-mirror of the phase of the second filter means.

4. Apparatus according to claim 3, wherein the second filter means comprises first and second high pass filters arranged to filter the fsc chrominance signals, a half adder for forming an output equal to half the sum of the input signals filtered by the first and second pass filters, a half subtractor for forming an output signal equal to half the difference between the outputs of the first and second high pass filters, a line delay for delaying the output of half adder by one video line and a subtractor for subtracting the output from the half subtractor from the output from the line delay.

5. A splitter for a received Weston Clean PAL video signal (W-PAL) transmitted in accordance with claim 1 comprising:
   third filter means for filtering the luminance component of the second W-PAL signal;
   fourth filter means for filtering the chrominance component of the second W-PAL signal; and
   co-phased or quadrature demodulating means for forming baseband luminance and chrominance signals; wherein
   the third filter means has a transfer function $$F_3 = (L_2-L_1)/2 + (L_2+L_1)z^{-1/2}$$

and the fourth filter means has a transfer function $$F_4 = (H_1+H_2)/2 - (H_1-H_2)z^{-1/2}$$

and $$F_3(f) = -F_2 \cdot (2fsc-f)$$

and $$F_4(f) = F_1 \cdot (2fsc-f)$$

where f $F_1$, $F_2$, $H_1$, $H_2$, $L_1$, $L_2$, and $z^{-1}$ are as defined in claim 1.

6. Apparatus for receiving a Weston Clean PAL (W-PAL) transmitted video signal having a luminance component and a chrominance component for storage or display, and transmitted by apparatus according to claim 1, comprising a splitter for splitting the received W-PAL signal to form baseband luminance chrominance signals, the splitter comprising:
   third filter means for filtering the received luminance component;
   fourth filter means for filtering the received chrominance component; and
   co-phased or quadrature demodulating means for demodulating the outputs of the third and fourth filter means to produce baseband luminance and chrominance signals; wherein
   the third filter means has a transfer function $$F_3 = (L_2-L_1)/2 + (L_2+121)z^{-1/2}$$

the fourth filter means has a transfer function $$F_4 = (H_1+H_2)/2 - (H1-H_2)z^{-1/2}$$

where $L_1$, $L_2$, $H_1$, $H_2$ are transfer functions of first and second low pass filters and first and second high pass filters respectively and $z^{-1}$ is the transfer function of a video line delay, and wherein $$F_3(f) = -F_2 \cdot (2fsc-f)$$

and $$F_4(f) = -F_1 \cdot (2fsc-f)$$

where f, $F_1$ and $F_2$ are as defined in claim 1.

7. Apparatus according to claim 6 or 5, wherein the third filter means comprises first and second low pass filters for filtering the received W-PAL luminance componet, a half adder having an output equal to half the sum of the outputs of the first and second low pass filters, a line delay for delaying the output of the half adder by one video line, a half subtractor for producing an output equal to half the difference between the second and first low pass filters, and an adder for summing the outputs of the line delay and the half subtractor.

8. Apparatus according to claim 6 or 5, wherein the fourth filter means comprises first and second high pass filter for filtering the received W-PAL chrominance component, a half adder having an output equal to half the sum of the outputs of the high pass filters, a half substractor having an output equal to half the difference between the outputs of the first and second high pass filters, a line delay for delaying the output of the half subtractor by a video line, and a subtractor for subtracting the output of the line delay from the output of the half adder.

9. An assembler for a Weston Clean PAL (W-PAL) video signal comprising:
first filter means for filtering a luminance signal sampled at twice a subcarrier frequency;
second filter means for filtering sum and difference chrominance signals sampled at the subcarrier frequency; and
means for adding filtered luminance and chrominance signals from n said first and second filter means for transmission in a PAL channel having a high pass link filter;
a splitter having third and fourth filter means, the first and second filter means being chosen in conjunction with the third and fourth filter means in the splitter such that
the amplitudes of the fourth and third filter means are shifted mirrors of the amplitudes of the first and second filter means, respectively, and the product of the first and third filter means and the second and fourth filter means are Nyquist filters $N_y$, $N_c$.

10. A splitter for a Weston Clean PAL (W-PAL) transmitted video signal having luminance and chrominance components, comprising
third filter means for filtering a received W-PAL transmitted video signal to form a luminance signal for display or recording;
fourth filter means for filtering a received W-PAL transmitted video signal to form a chrominance signal for display or recording; and
means for demodulating the received W-PAL transmitted video signal;
wherein the luminance and chominance components thereof are filtered prior to transmission by first and second filter means, respectively, and
the amplitude of the fourth and third filter means are shifted mirrors of the first and second filter means, respectively, and
the product of the first and third filter means and of the second and fourth filter means are Nyquist filters $N_y$, $N_c$.

11. A splitter according to claim 10, wherein the phase of the fourth and third filter means is the anti-mirror of the phase of the first and second filter means respectively.

12. Apparatus for generating a Weston Clean PAL (W-PAL) video signal for transmission in which a 2fsc luminance signal Y is sampled at twice a color sub-carrier frequency f and fsc chrominance components U, V are sampled at the color subcarrier frequency and carried as sum (U+V) and difference (U−V) signals on alternate video lines, comprising:
an assembler for assembling co-phased or quadrature 2fsc luminance signals and fsc chrominance components to form a PAL signal for transmission and having;
first filter means for filtering the 2fsc luminance signal;
second filter means for filtering the fsc chrominance components; and
means for adding the filtered 2fsc luminance signal and fsc chrominance components to form a PAL video signal; wherein
the first filter means has a transfer function $F_1 = (L_2+L_1)/2 + (L_2-L_1) z^{-1/2}$ and the second filter means has a transfer function $F_2 = -(H_1+H_2)/2 + (H_1+H_2) z^{-1/2}$
where $L_1$, $L_2$ are transfer functions of first and second low pass filters and $H_1$, $H_2$ are transfer functions of first and second high pass filters and $z^{-1}$ is the transfer function of a video delay line; and wherein $$H_1(f) = L_2(2fsc - f)$$

and $$H_2(f) = L_1(2fsc - f).$$

13. An assembler for a Weston Clean PAL (W-PAL) video signal comprising:
first filter means for filtering a luminance signal sampled at twice a subcarrier frequency f;
second filter means for filtering sum (U+V) and difference (U−V) chrominance signals sampled at the subcarrier frequency; and
means for adding the filtered luminance and chrominance signals for transmission in a PAL channel; wherein the first filter means $F_1 = (L_2+L_1)/2 + (L_2-L_1) z^{-1/2}$ and the second filter means has a transfer function $$F_2 = -(H_1 - H_2)/2 + (H_1+H_2)z^{-1/2}$$

where $L_1$, $L_2$ are transfer functions of first and second low pass filters; $H_1$, $H_2$ are transfer functions of first and second high pass filters, $z^{-1}$ is the transfer function of a video line delay, and wherein $$H_1(f) = L_2(2fsc - f)$$

and $$H_2(f) = L_1(2fsc - f).$$

14. Apparatus according to claim 12 or 13, wherein the first filter means comprises first and second low pass filters arranged to filter the 2fsc luminance signal, a half adder for forming an output signal equal to half the sum of the output of the first and second low pass filters, a half subtractor for forming an output signal equal to half the difference between the second and first filter outputs, a line delay for operating on the output of the half subtractor to delay it by one video line, and a second adder for adding the outputs of the half adder and the line delay to form the luminance input to the said adding means of the assembler.

15. Apparatus according to claim 12 or 13, wherein the first and second filter means are combined and comprise a low pass filter section having first and second low pass filters, each arranged to filter the 2fsc luminance signal, a half adder and a half subtractor forming, respectively, output signals equal to half the sum and half the difference of the outputs of the second and first low pass filters;

a high pass filter section having first and second high pass filters, each arranged to filter the fsc chrominance signals, a half adder and a half subtractor forming, respectively, output signals equal to half the sum and half the difference of the outputs first and second high pass filters;

a subtractor means for subtracting the output of the half subtractor of the high pass filter section from the output of the half adder of the low pass filter section to form a first input to the adding means of the assembler, a further adder for adding the outputs of the half subtractor of the low pass filter section and the half adder of the high pass filter section, and a line delay for delaying the output of the further adder by one video line to form the second input to the adding means of the assembler.

16. Apparatus according to claim 14, wherein the second low pass filter has a cut frequency starting at fsc for a luminance signal amplitude equal to unity and stopping at 5 MHz for a luminance signal amplitude equal to zero, and the first low pass filter has a cut frequency starting at 4 MHz for a luminance signal amplitude equal to unity and stopping at 4.6 MHz for a luminance signal amplitude equal to zero.

17. Apparatus according to claim 14, wherein the second low pass filter has a cut frequency starting at fsc for luminance signal amplitude equal to unity and stopping at 5 MHz for luminance signal amplitude equal to zero, and the first low pass filter has a cut frequency starting at 4 MHz for amplitude equal to unity and stopping at 4.6 MHz for amplitude equals zero.

18. A Weston Clean PAL (W-PAL) video signal system in which a luminance signal is sampled at twice a color sub-carrier frequency f and chrominance components U, V are sampled at the subcarrier frequency and carried as sum (U+V) and difference (U+V) signals, comprising at a transmitter;

an assembler for assembling a co-phased or quadrature luminance signal and co-phased or quadrature chrominance components to form a PAL signal for transmission and having;

first filter means for filtering the luminance signal;

second filter means for filtering the chrominance components; and means for adding the outputs of the first and second filter means to form a W-Pal signal having a luminance component and a chrominance output for transmission;

first filter means for filtering the luminance signal;

second filter means for filtering the chrominance components; and means for adding the outputs of the first and second filter means to form a W-PAL signal having a luminance component and a chrominance output for transmission;

and at a receiver:

a splitter for splitting a received W-PAL signal to form baseband luminance and chrominance signals for storage of display and having;

third filter means for filtering the received luminance component for the W-PAL signal;

fourth filter means for filtering the received chrominance component for the W-PAL signal; and demodulation means for demodulating the outputs of the third and fourth filter means in co-phase or quadrature;

wherein the first to fourth filter means have transfer functions $F_1$ to $F_4$ defined by $$F_1 = (L_2 + L_1)/2 + (L_2 - L_1)z^{-1}/2$$

$$F_2 = -(H_1 - H_2)/2 + (H_1 + H_2)z^{-1}/2$$

$$F_3 = (L_2 - L_1)/2 + (L_2 + L_1)z^{-1}/2$$

$$F_4 = (H_1 + H_2)/2 - (H_1 - H_2)z^{-1}/2$$

and wherein $$H_1(f) = L_2(2fsc - f)$$

and $$H_2(f) = L_1(2fsc - f)$$

where $L_1$, $L_2$ are transfer functions of first and second low pass filters, $H_1$, $H_2$ are transfer functions of high pass filters and $z^{-1}$ is the transfer function of a video line delay.

* * * * *